(12) United States Patent
Otto et al.

(10) Patent No.: US 12,710,552 B2
(45) Date of Patent: Aug. 18, 2026

(54) METHOD AND ASSEMBLY FOR MONITORING THE INTEGRITY OF FREE INERTIAL POSITION AND VELOCITY MEASUREMENTS OF AN AIRCRAFT

(71) Applicant: Archer Aviation Inc., San Jose, CA (US)

(72) Inventors: Gustav Otto, Wörthsee (DE); Ettore De Lellis, Munich (DE); Vladislav Apostolyuk, Munich (DE)

(73) Assignee: Archer Aviation Inc., San Jose, CA (US)

( * ) Notice: Subject to any disclaimer, the term of this patent is extended or adjusted under 35 U.S.C. 154(b) by 209 days.

(21) Appl. No.: 17/684,813

(22) Filed: Mar. 2, 2022

(65) Prior Publication Data

US 2022/0291396 A1 Sep. 15, 2022

(30) Foreign Application Priority Data

Mar. 12, 2021 (EP) .................................... 21162380

(51) Int. Cl.
*G01S 19/47* (2010.01)
*G01P 21/00* (2006.01)
(Continued)

(52) U.S. Cl.
CPC .............. *G01S 19/47* (2013.01); *G01P 21/00* (2013.01); *G01S 19/52* (2013.01); *G01S 19/53* (2013.01)

(58) Field of Classification Search
CPC combination set(s) only.
See application file for complete search history.

(56) References Cited

U.S. PATENT DOCUMENTS 5,050,087 A * 9/1991 Walrath ............... G05D 1/0808 701/4
5,841,537 A * 11/1998 Doty ...................... G01C 19/72 701/500

(Continued)

FOREIGN PATENT DOCUMENTS

WO WO-2009130576 A1 * 10/2009 ............. G01C 21/16

OTHER PUBLICATIONS

European Search Report for EP 21 162 380.6. Mailed Sep. 21, 2021. 8 pages.

(Continued)

*Primary Examiner* — Vladimir Magloire
*Assistant Examiner* — Eric K Hodac
(74) *Attorney, Agent, or Firm* — Finnegan, Henderson, Farabow, Garrett & Dunner, LLP

(57) ABSTRACT

Disclosed is a method for monitoring the integrity of an inertial measurement assembly of an aircraft, the measurement assembly comprising at least one high-grade measurement unit; and at least two low-grade measurement units; each of the measurement units comprises a sensor unit and a processing unit coupled to the respective sensor unit, the respective sensor units measure accelerations and angular rates of the aircraft and provide raw data based on said measurements; the respective processing units provide processed data reflecting the velocity and/or attitude of the aircraft; the method comprising: receiving raw data output by the sensor units and evaluating according to at least one predetermined criterion whether the raw data of each sensor unit are consistent with one another; and receiving the processed data output by the processing units and evaluating whether the processed data of each processing unit are consistent with one another.

13 Claims, 1 Drawing Sheet

Figure 1:
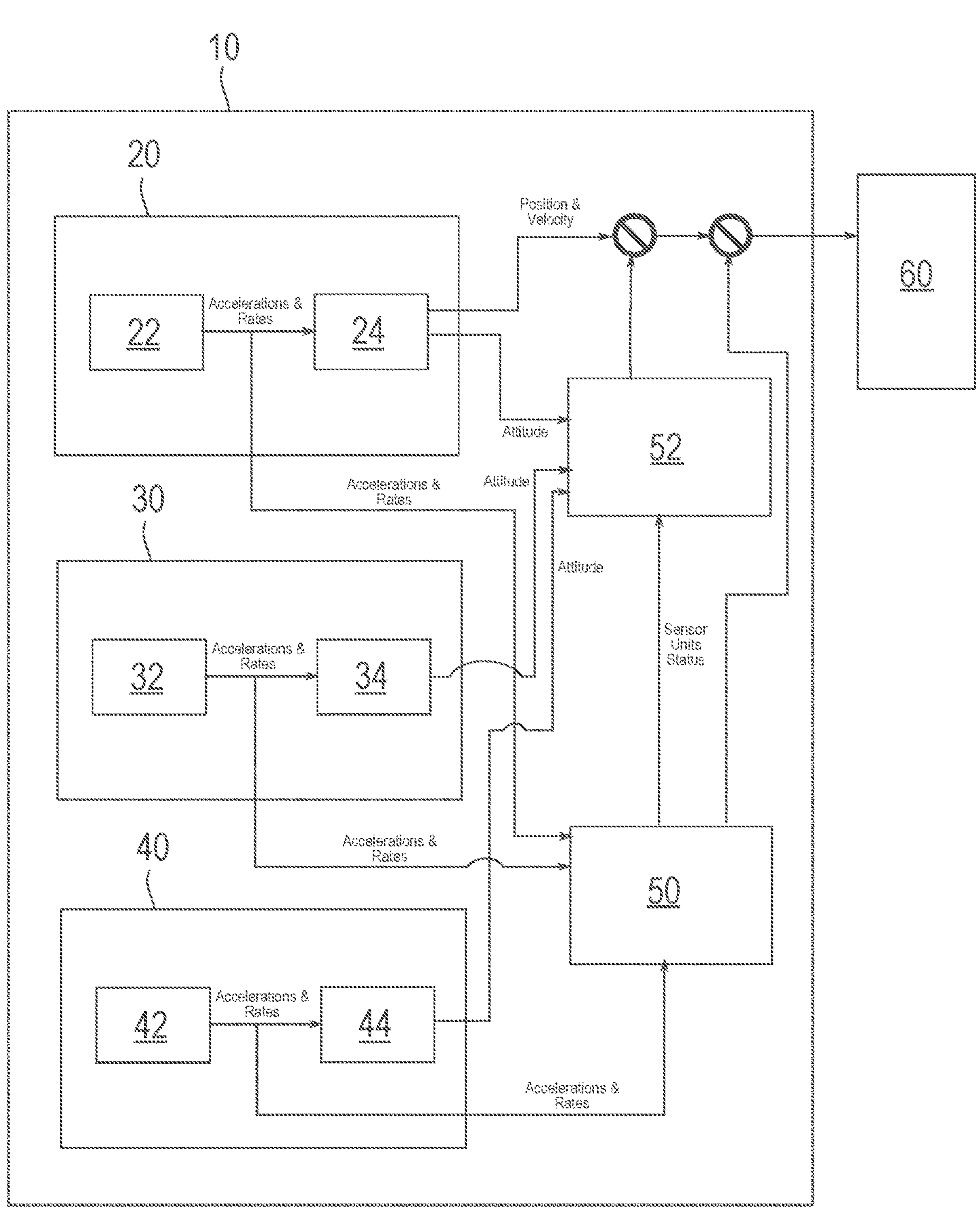

(51) Int. Cl.
*G01S 19/52* (2010.01)
*G01S 19/53* (2010.01)

(56) References Cited

U.S. PATENT DOCUMENTS

| | | | | |
|---|---|---|---|---|
| 8,275,544 | B1 * | 9/2012 | Wells | G01S 17/86 342/146 |
| 10,209,076 | B1 * | 2/2019 | McNamara | G01S 19/53 |
| 2011/0040430 | A1 | 2/2011 | Bombardier et al. | |
| 2012/0004846 | A1 | 1/2012 | Coatantiec et al. | |
| 2015/0032300 | A1 | 1/2015 | Arethens et al. | |

OTHER PUBLICATIONS

Office Action in connection to EP Application No. 21162380.6, dated Jan. 17, 2024.

International Search Report and Written Opinion issued for Application No. PCT/EP2022/052570, dated Jun. 23, 2022.

* cited by examiner

METHOD AND ASSEMBLY FOR MONITORING THE INTEGRITY OF FREE INERTIAL POSITION AND VELOCITY MEASUREMENTS OF AN AIRCRAFT

The present invention relates to a method for monitoring the integrity of free inertial position and velocity measurements of an aircraft as well as to an inertial measurement assembly of an aircraft with integrated integrity monitoring and an aircraft comprising such an assembly.

Measuring the inertial position and velocity of an aircraft is critical to flight control in particular in aircrafts with vertical takeoff and landing capabilities, especially during their hover and transition phases of flight. Also, many autonomous systems with high level of automation in such aircrafts, such as advanced autopilot or even fully-automated flight control systems heavily rely on precise and correct measurements of the inertial position and velocity of the aircraft, such that it is of utmost importance to be able to detect any occurrence of sensor failure, degraded performance or erroneous computation for all relevant quantities during determining the inertial position and velocity. The integrity of the free inertial velocity is also critical in monitoring of GNSS-based and hybrid/coupled inertial position and velocity measurements.

In this context, different types of measurement units are known, which can provide measurements of the inertial position and velocity or at least an attitude of an aircraft by means of detecting accelerations and angular rates at different installation positions in the aircraft. It is furthermore known to additionally employ global navigation systems (GNSS) to ensure the integrity of inertial position and velocity measurements and to correct for sensor drift, which inevitably occurs during the detection and integration of accelerations and angular rates and may be more or less pronounced and problematic in different available types of sensors. These GNSS corrections are however dependent on the integrity of the GNSS signal in space, which is subject to various effects that could affect accuracy and integrity. For this reason, cross comparison is needed for monitoring between the free inertial and hybrid solutions, where the hybrid solution is the fusion of the inertial sensors with GNSS data to improve the accuracy of both the inertial velocity and position.

Examples for available measurement units for this application include AHRS (attitude heading reference system) and INS (inertial navigation system) type units, which may in turn comprise angular rate and acceleration sensors of different grades of performance and corresponding costs, in particular fibre optic, MEMS devices or mechanical gyroscopic platforms, etc.

Since it is furthermore essential that reliable measurements of the inertial position and velocity are available at all times during flight even in case of failures or problems in at least one available measurement unit, at least three redundant measurement units are usually provided in a single aircraft which depending on the employed unit types thus contribute to a certain extend to the weight and the system cost of the aircraft as a whole.

One aspect in configurations with multiple redundant measurement units is the integrity monitoring of said plurality of units by means of which it has to be ensured that the data provided by the individual units is consistent and reliable such that it can be used for automated systems or pilot assistance. Previously, each such unit has monitored the integrity of its own output, however, unit types only capable of providing measurements of accelerations and angular rates yet without the capability of providing accurate inertial position and velocity measurements themselves would have had to rely on GNSS data which may not always be readily available.

Due to these shortcomings in the integrity monitoring strategy with certain types of measurement units, in order to provide a reliable and redundant system, all of the redundant units in previously known aircrafts were of high-grade types, which are capable of providing the full range of necessary data for the calculation of the free inertial position and velocity of the aircraft, without relying on additional GNSS corrections. However, said high-grade measurement units are relatively expensive and heavy such that it would be beneficial to be able to reduce the weight and costs of an integrated inertial measurement assembly of an aircraft, while still being able to ensure full integrity monitoring of the output of said measurement units.

It is therefore the object of the present invention to provide for an integrity monitoring of the free inertial position and velocity measurement in an aircraft which meets desired safety requirements without relying on GNSS availability while using components with reduced costs and system weight.

For this purpose, according to a first aspect, the present invention relates to a method for monitoring the integrity of the inertial position and velocity measurements of an inertial measurement assembly of an aircraft, wherein the measurement assembly comprises at least one high-grade measurement unit and at least two low-grade measurement units, wherein each of the measurement units in turn comprises a sensor unit and a processing unit operatively coupled to the respective sensor unit, wherein the respective sensor units measure accelerations and angular rates of the aircraft and provide raw data based on said measurements, wherein the respective processing units process the raw data provided by the sensor units and provide processed data reflecting the position, velocity and attitude of the aircraft, wherein the method comprises at a sensor monitor unit, receiving the raw data output by each of the sensor units and evaluating according to at least one predetermined criterion whether the raw data of each sensor unit are consistent with one another, and at an attitude monitoring unit, receiving the processed data output by each of the processing units and evaluating according to at least one predetermined criterion whether the processed data of each processing unit are consistent with one another.

Thus, according to the method of the present invention, measurement units of different grades may be combined in a way that monitoring of the integrity of the overall system and in particular the at least one high-grade measurement unit is possible in order to identify erroneous hybrid inertial position and velocity data, even without relying on GNSS by using the free inertial position and velocity data, while being able to replace at least some of the high-grade measurement units of the above-discussed prior art systems with lighter and cheaper low-grade measurement units without any deterioration of the system concerning its ability to monitor its integrity. The method according to the invention is furthermore capable of detecting both failures of the primary sensor units, such as hardware failures, and erroneous processing of data due to failures of the processing hardware and/or software.

Different techniques are conceivable for comparing the output data of the individual sensor units and processing units for evaluating whether they are consistent with one another. In simple examples, thresholds for acceptable deviations between the output sensor data may be used, while in more sophisticated embodiments, high-level algorithms, for example taking into account the known behaviour patterns of different sensor types may be employed exclusively or in combination with other criteria.

Also, in case of a detection of an inconsistency between sensor unit output and/or processing unit output, different measures may be taken in the aircraft, for example in the case that at least one of the sensor monitoring unit and the attitude monitoring unit evaluates that the respective data are inconsistent with one another, a warning may be issued to a pilot of the aircraft and/or an operational mode of the aircraft may be modified. For example, certain automated functionalities of the aircraft may be switched off and respective control responsibilities may be handed over to a human pilot in case the integrity measurement shows an inconsistency between the data provided by the individual measurement units.

In any case, mitigation of the detected inconsistencies and their respective effects may be undertaken with a variety of strategies, which may comprise that in the case that at least one of the sensor monitoring unit and the attitude monitoring unit evaluates that the respective data are inconsistent with one another, an error location may be identified. Such an error location may comprise an assessment, which one out of the plurality of measurement units provides output data which is inconsistent with the remaining measurement units, such that the identified unit can be excluded and the error isolated. In case it is found that the high-grade sensor (INS) is the source of the error, it may be deduced that the computed free inertial position and velocity has lost integrity and is no longer a valid source of data. It may further be determined that the hybrid solution would also be affected and GNSS corrections may be incorrectly excluded, despite being correct, due to the failure of the high-grade sensor. The system would therefore revert away from using the free inertial data as a source for monitoring the GNSS solution, rather using the hybrid solution, if available, from the low-grade sensors or the pure GNSS solution for inertial position and velocity.

While it is in principle possible that the sensor monitoring unit and the attitude monitoring unit are working completely independently, in other possible embodiments, the attitude monitoring unit may be operatively coupled to the sensor monitoring unit and therefrom receive data on the outcome of the evaluating whether the raw data of each sensor unit are consistent with one another, such that said previously evaluated status of the sensor units may equally be processed by the attitude monitoring unit in order to derive whether the processed data is consistent with one another by means of suitable algorithms which use the output of the sensor monitoring unit as one of their input variables.

Compared to the frequency at which a flight control unit of a typical aircraft is operating, the evaluating of the raw data and/or the processed data in the method according to the present invention may be performed at a frequency which is lower than said operational frequency of the flight control unit and/or said frequency may be in the order of 0.1 to 10 Hz.

According to a second aspect, the present invention relates to an inertial measurement assembly of an aircraft with integrated integrity monitoring, comprising at least one high-grade measurement unit and at least two low-grade measurement units, wherein each of the measurement units comprises a sensor unit and a processing unit operatively coupled to the respective sensor unit, wherein the respective sensor units are configured to measure accelerations and angular rates of the aircraft and provide raw data based on said measurements, wherein the respective processing units are configured to process the raw data provided by the sensor units and provide processed data reflecting the free inertial position, velocity and/or attitude of the aircraft, wherein the assembly further comprises a sensor monitoring unit configured to receive the raw data output by each of the sensor units and evaluate according to at least one predetermined criterion whether the raw data of each sensor are consistent with one another, and an attitude monitoring unit configured to receive the processed data output by each of the processing units and evaluate according to at least one predetermined criterion whether the processed data of each sensor are consistent with one another.

Herein, the at least one high-grade measurement unit may be of the INS type and/or the at least two low-grade measurement units may be of AHRS type. In such configurations, the at least one INS type high-grade measurement unit may produce position, velocity and attitude estimations for the aircraft, while the two or more AHRS type low-grade measurement units produce only attitude estimations. Furthermore, the AHRS type measurement units are both lighter and cheaper than INS measurement units, however, with the method according to the invention as discussed above, a full integrity monitoring and a reliable operation of the inertial measurement assembly according to the present invention can be guaranteed nonetheless. Generally speaking, however, the architecture of at least one high-grade measurement unit providing free inertial position, velocity and attitude estimations and at least two low-grade measurement units providing attitude estimations only independently from the actual unit types may allow for an indirect monitoring of the free inertial position and velocity measurements without the necessity to produce redundant estimations thereof.

The sensor units of the measurement units may in turn comprise at least one angular rate sensor and at least one acceleration sensor, in particular a gyroscope, an accelerometer, a fibre optical device and a MEMS device, etc. while generally speaking, the present invention is not restricted to any of said types of sensor units but any suitable sensor unit type and number may be employed for this purpose.

Also, the sensor monitoring unit and the attitude monitoring unit of the assembly according to the invention may be implemented in a single device, such as a single piece of hardware, or duplicated over-redundant devices.

Additionally and for further redundancy and sensor fusion purposes, the assembly according to the invention may nevertheless additionally comprise at least one GNSS receiver. However, the assembly according to the invention is especially suitable to increase the integrity of the free inertial position and velocity measurement for meeting desired safety requirements even without relying on GNSS availability at all times.

As already mentioned above, the at least two low-grade measurement units may be more compact than the high-grade measurement units in addition to being both lighter and cheaper.

Furthermore, the present invention relates to an aircraft, which comprises an inertial measurement assembly according to the present invention as well as a flight control unit, wherein preferably at least one of the sensor monitoring unit and the attitude monitoring unit may be implemented by the flight control unit, i.e. the same hardware. Alternatively, at least one of the sensor monitoring unit and the attitude monitoring unit may be provided as a separate device and be coupled to the flight control unit of the aircraft via suitable communication means.

Further features and advantages of the present invention will become even clearer from the following description of an embodiment thereof when taken together with the accompanying FIG. 1, which shows a schematic view of an inertial measurement assembly according to the present invention.

In said FIG. 1, an inertial management assembly of an aircraft, for example an electrical propulsion vertical take-off and landing (eVTOL) aircraft, is generally denoted with reference numeral 10 and comprises a single high-grade measurement unit 20, for example of the INS type, as well as two low-grade measurement units 30 and 40, for example of the AHRS type. While in the following mainly one of the low-grade measurement units 30, 40 will be discussed in detail, it shall at this point be pointed out that said two units may be chosen to be of an identical type or that they can be chosen of dissimilar types in order to further increase redundancy under certain conditions, if this is required or desired in the actual implementation of the assembly and the aircraft.

The high-grade measurement unit 20 in turn comprises a sensor unit 22, which detects accelerations and angular rates of the aircraft and provides accordingly raw data to a processing unit 24 of the high-grade measurement unit 20, in which the raw data are processed in a manner that the attitude as well as the inertial velocity of the aircraft can be derived and corresponding data will be output. Said processing may for example comprise integrating accelerations over time in order to retrieve velocities and positions, such that on average a certain rate of sensor drift is expected over time due to imperfections of mechanical and/or electronic components.

Similarly, the low-grade measurement units 30, 40 comprise respective sensor units 32, 42 as well as processing units 34, 44, wherein again the sensor units 32, 42 output raw data representing accelerations and angular rates and the processing units 34, 44 process said data in order to at least provide an estimated attitude of the aircraft. Compared to the high-grade measurement unit 20, the low-grade measurement units 30, 40 may be of a lower grade in that they are cheaper and lighter, employ less sensitive sensor units, which in turn provide less precise acceleration and angular rate data and/or may be configured to only output attitude data without calculating and providing the free inertial position or velocity of the aircraft itself.

Furthermore, the assembly 10 according to the invention comprises a sensor monitoring unit 50 as well as an attitude monitoring unit 52, which are implemented by means of suitable hardware and receive raw data from the sensor units 22, 32, 42 of the measurement units 20, 30, 40 and processed data output by the processing units 24, 34, 44 of the measurement units 20, 30, 40, respectively.

Each of the sensor monitoring unit 50 and the attitude monitoring unit 52 is configured to evaluate the data provided by each of the measurement units 20, 30, 40 according to predetermined criteria by means of suitable algorithms in order to evaluate whether the raw data and processed data, respectively, are consistent with one another among the individual measurement units 20, 30, 40. For this purpose, the attitude monitoring unit 52 may further receive data output by the sensor monitoring unit 50 concerning the status of the individual sensor units 22, 32, 42 as a possible input for its processing operations.

As further shown in FIG. 1, the inertial velocity output by the high-grade measurement unit 20 to a flight control unit 60 of the corresponding aircraft may thus be vetoed depending on whether one of the sensor monitoring unit 50 and the attitude monitoring unit 52 evaluates that the respective outputs of the sensor units 22, 32, 42 or processing units 24, 34, 44 are inconsistent with one another. Said veto may for example be performed by a dedicated veto hardware unit or for example also by the flight control unit 60 based on the output data of the sensor monitoring unit 50 and the attitude monitoring unit 52. Accordingly, the flight control unit 60 may take corresponding measures for mitigating the detected inconsistency between the measurement unit 20, 30, 40 and for example may issue a warning to a pilot of the aircraft or modify an operational mode of the aircraft.

The invention claimed is:

1. A method for monitoring the integrity of an inertial measurement assembly of an aircraft, the measurement assembly comprising:

a single high-grade measurement unit; and at least two low-grade measurement units;

wherein the single high-grade measurement unit is of an inertial navigation system (INS) type and the at least two low-grade measurement units are of an attitude heading reference system (AHRS) type, wherein each of the measurement units comprises a sensor unit and a processing unit operatively coupled to the respective sensor unit, wherein the respective sensor units measure accelerations and angular rates of the aircraft and provide raw data based on said measurements;

wherein the respective processing units process the raw data provided by the sensor units and provide processed data reflecting the velocity and/or attitude of the aircraft; the method comprising:

at a sensor monitoring unit, receiving the raw data output by each of the sensor units and evaluating according to at least one predetermined criterion whether the raw data of each sensor unit are consistent with one another; and at an attitude monitoring unit, receiving the processed data output by each of the processing units and evaluating according to at least one predetermined criterion whether the processed data of each processing unit are consistent with one another.

2. The method according to claim 1, further comprising, in the case that at least one of the sensor monitoring unit and the attitude monitoring unit evaluates that the respective data are inconsistent with one another, issuing a warning to a pilot of the aircraft and/or modifying an operational mode of the aircraft.

3. The method according to claim 1, further comprising, in the case that at least one of the sensor monitoring unit and the attitude monitoring unit evaluates that the respective data are inconsistent with one another, identifying an error location.

4. The method according to claim 1, wherein the attitude monitoring unit is operatively coupled to the sensor monitoring unit and therefrom receives data on the outcome of the evaluating whether the raw data of each sensor units are consistent with one another.

5. The method according to claim 1, wherein evaluating of the raw data and/or the processed data is performed at a frequency which is lower than an operational frequency of a flight control unit of the aircraft and/or at a frequency in the order of 0.1 to 10 Hz.

6. An inertial measurement assembly of an aircraft with integrated integrity monitoring, comprising:

a single high-grade measurement unit; and at least two low-grade measurement units;

wherein the single high-grade measurement unit is of a inertial navigation system (INS) type and the at least two low-grade measurement units are of an attitude heading reference system (AHRS) type, wherein each of the measurement units comprises a sensor unit and a processing unit operatively coupled to the respective sensor unit, wherein the respective sensor units are configured to measure accelerations and angular rates of the aircraft and provide raw data based on said measurement;

wherein the respective processing units are configured to process the raw data provided by the sensor units and provide processed data reflecting the velocity and/or attitude of the aircraft;

the assembly further comprising:

a sensor monitoring unit configured to receive the raw data output by each of the sensor units and evaluate according to at least one predetermined criterion whether the raw data of each sensor units are consistent with one another;

an attitude monitoring unit configured to receive the processed data output by each of the processing units and evaluate according to at least one predetermined criterion whether the processed data of each processing unit are consistent with one another.

7. The assembly according to claim 6, wherein the sensor units comprise at least one angular rate sensor and at least one acceleration sensor, in particular a gyroscope, an accelerometer, a fibre optical device and a MEMS device, etc.

8. The assembly according to claim 6, wherein the sensor monitoring unit and the attitude monitoring unit are implemented in a single device.

9. The assembly according to claim 6, further comprising at least one GNSS receiver.

10. The assembly according to claim 6, wherein the at least two low-grade measurement units are more compact than the single high-grade measurement unit.

11. An aircraft, comprising an inertial measurement assembly according to claim 6, and a flight control unit.

12. The aircraft according to claim 11, wherein at least one of the sensor monitoring unit and the attitude monitoring unit is implemented by the flight control unit.

13. The assembly according to claim 6, wherein the sensor monitoring unit is a separate device from the measurement units and is communicably coupled with the measurement units.

* * * * *